United States Patent
Baillot et al.

(10) Patent No.: US 10,256,662 B2
(45) Date of Patent: Apr. 9, 2019

(54) METHOD FOR DYNAMICALLY CONTROLLING A PIECE OF ELECTRICAL EQUIPMENT

(71) Applicant: SUNNA DESIGN, Blanquefort (FR)

(72) Inventors: Raphael Baillot, Saint-Savin (FR); Thomas Samuel, Porcheres (FR)

(73) Assignee: SUNNA DESIGN, Blanquefort (FR)

( * ) Notice: Subject to any disclaimer, the term of this patent is extended or adjusted under 35 U.S.C. 154(b) by 481 days.

(21) Appl. No.: 14/654,596

(22) PCT Filed: Dec. 11, 2013

(86) PCT No.: PCT/FR2013/053028
§ 371 (c)(1),
(2) Date: Sep. 18, 2015

(87) PCT Pub. No.: WO2014/102480
PCT Pub. Date: Jul. 3, 2014

(65) Prior Publication Data
US 2016/0006294 A1   Jan. 7, 2016

(30) Foreign Application Priority Data

Dec. 28, 2012   (FR) .................................. 12 62933

(51) Int. Cl.
*F21L 4/08*       (2006.01)
*F21S 9/03*       (2006.01)
(Continued)

(52) U.S. Cl.
CPC   *H02J 7/35* (2013.01); *F21L 4/08* (2013.01); *F21S 9/037* (2013.01); *H01M 10/465* (2013.01);
(Continued)

(58) Field of Classification Search
CPC ...... F21L 4/08; F21S 9/03; F21S 9/032; F21S 9/035; F21S 9/037; H01M 10/443;
(Continued)

(56) References Cited

U.S. PATENT DOCUMENTS

| | | | |
|---|---|---|---|
| 5,151,865 A | 9/1992 | Blessing et al. | |
| 6,081,104 A * | 6/2000 | Kern | H02J 9/065 320/101 |
| 6,191,568 B1 | 2/2001 | Poletti | |
| 7,088,222 B1 * | 8/2006 | Dueker | B60Q 7/00 340/321 |
| 9,273,840 B1 * | 3/2016 | Braun | F21S 9/035 |
| 2009/0129067 A1 | 5/2009 | Fan et al. | |

(Continued)

FOREIGN PATENT DOCUMENTS

FR   2922628   4/2009

*Primary Examiner* — Levi Gannon
(74) *Attorney, Agent, or Firm* — Bachman & LaPointe, P.C.

(57) ABSTRACT

The present invention concerns a method for dynamically controlling powering a piece of electrical equipment powered by an energy storage element and a renewable energy source, the power of the power supply of said equipment being temporally variable according to an adjustable reference time curve characterized in that it comprises steps of adjustment on the basis of at least one external factor and at least one internal factor, and the constraint according to which the integral over the relevant operating cycle of said adjusted curve is lower than the quantity of energy that can be allocated from said energy storage element, during the relevant operating cycle, said external factors being physical parameters acquired by local sensors. The invention also concerns a lighting system implementing this method, an array of such electrical systems and a method for detecting one or a plurality of malfunctions of such a lighting system.

16 Claims, 3 Drawing Sheets

(51) Int. Cl.
*H01M 10/44* (2006.01)
*H01M 10/46* (2006.01)
*H01M 10/48* (2006.01)
*H02J 7/35* (2006.01)
*H05B 37/02* (2006.01)
*H05B 37/03* (2006.01)
*H01M 10/42* (2006.01)

(52) U.S. Cl.
CPC ......... *H05B 37/02* (2013.01); *H05B 37/0272* (2013.01); *H05B 37/03* (2013.01); *H01M 10/443* (2013.01); *H01M 10/486* (2013.01); *H01M 2010/4278* (2013.01)

(58) Field of Classification Search
CPC ............. H01M 10/465; H01M 10/486; H01M 2010/4278; H02J 7/35; H05B 37/02; H05B 37/0272; H05B 37/03
See application file for complete search history.

(56) References Cited

U.S. PATENT DOCUMENTS

| | | | |
|---|---|---|---|
| 2010/0057138 A1 | 3/2010 | Murner et al. | |
| 2010/0201267 A1* | 8/2010 | Bourquin | H05B 37/0227 315/32 |
| 2010/0328933 A1 | 12/2010 | Maldonado | |
| 2011/0018448 A1* | 1/2011 | Metchear, III | F21S 8/083 315/152 |
| 2011/0095922 A1 | 4/2011 | Sekiguchi et al. | |
| 2011/0170283 A1* | 7/2011 | Chan | G09F 9/33 362/183 |
| 2012/0091901 A1* | 4/2012 | Tanigawa | F21S 9/03 315/158 |
| 2012/0293077 A1* | 11/2012 | Tousain | H02J 7/00 315/152 |
| 2014/0292527 A1* | 10/2014 | Sisneros | G08B 13/19695 340/693.1 |
| 2016/0295658 A1* | 10/2016 | Chraibi | H05B 33/0845 |

* cited by examiner

METHOD FOR DYNAMICALLY CONTROLLING A PIECE OF ELECTRICAL EQUIPMENT

BACKGROUND

The present invention relates to the field of power supply of electrical equipment by a renewable energy source and an energy storage element.

It relates in particular to equipment such as a solar LED lighting system comprising a LED lighting module, a photovoltaic panel, a power battery and an electronic circuit for managing energy.

The invention is however not limited to lighting, and also applies to other equipment powered by a renewable energy source and incorporating a storage means.

Solutions for optimizing the operation of such equipment are known in the state of the art.

For example, French Patent FR2922628 discloses a lamp comprising a pole fixed in the ground, a lantern fixed to a free end of the pole and comprising a lighting device and a power supply block adapted to supply electrical power to the lighting device. The power supply block comprises an electrical accumulation battery, an assembly of photovoltaic cells, a wind turbine, and an electrical accumulation circuit provided for charging an electrical accumulation battery from the electrical power provided by an assembly of photovoltaic cells and a wind turbine.

U.S. Pat. No. 5,151,865 discloses a method for determining the energy content value (EIW) of a battery by measuring the terminal voltage ($U_{KL}$) of an energy store, while taking into account at least one reference value (BW), that is formed from a sum current (IE) flowing in the energy store in a specific time unit (dt) and in a specific operating voltage range (BSB). This reference value (BW) thus represents a function value. The measured terminal voltage ($U_{KL}$) referred to the function value (FW) corresponds to a specific energy content value (EIW) in the energy content range (EIB).

U.S. Pat. No. 6,081,104 discloses a system for delivering power to a battery and to a load. The battery can be charged by the power source and used to supply energy or power to the load when the power source is unable to provide sufficient energy and power to the load. The system reduces injection of DC current into the load and, as a result, extends the operation life of the load, particularly if the load is a lighting system. The purpose of this system is to prevent premature ageing of the lighting load or of the battery.

U.S. Pat. No. 6,191,568 describes a load voltage modulation solution and power control and supply system for the supply of power to a load for which, over particular periods of time, usually on a daily basis, it is desired to reduce power. The invention has particular application to street lighting systems in which, for a period of several hours during the night (when traffic is minimal and many people are asleep), the luminaires of the lighting system can operate at reduced power.

The international patent application WO2011/095922 describes a method for controlling the light output profile on the basis of the lighting demand and the battery capacity under consideration of keeping the energy storage level above a predetermined minimum level during a predetermined time period, consisting in taking into account weather forecast data periodically acquired via an internet connection.

The main drawback of the solutions proposed in the prior art is that the guarantee of continuity of operation requires the oversizing of the power storage element and also of the renewable energy source since the system consumption is not adapted to the available energy of said energy storage element.

Failing that, if the storage element is not oversized, the special conditions encountered during certain operating cycles lead to an untimely interruption of the service provided by the electrical equipment.

Furthermore, the solution implementing the periodical acquisition of weather forecast data requires a connection to a future data server, and access to relevant predictive models with respect to the location of the lighting system.

Such forecast data are usually macroscopic, even extrapolated, and cover much greater areas than the implantation area of a lighting system.

The solutions of the prior art such as the one disclosed in WO2011/095922, indeed provide a response to the aimed continuity of service ("no blackout"), but require access to a data infrastructure such as a weather data base acquired by a server, preventing the implementation in areas underserviced by radio-frequency applications. Furthermore, these solutions require energy-consuming radio communication means, which goes against the objective of optimizing consumption and maximizing the service continuity using "frugal" means for generating and storing energy.

SUMMARY

To remedy the disadvantages of the prior art, the present invention, in its broadest sense, relates to a method for dynamically controlling powering a piece of electrical equipment powered by an energy storage element and a renewable energy source, with the supply power of said piece of equipment being temporally variable in an adjustable reference time curve, characterized in that it comprises steps of adjustment according to at least one external factor and at least one internal factor, and the constraint that the integral over the considered operating cycle of said adjusted curve corresponding to the consumed energy is lower than the quantity of energy which can be allocated from said energy storage element, during the operating cycle considered, with said external factors being physical parameters acquired by local sensors.

The physical parameters are specifically:
temperature
moisture
output power
fouling by dust or pollutants.
The local sensors consist of:
optoelectronic sensors, of the photodiode type
solar panels
temperature sensors, specifically temperature sensors or thermocouples
chemical sensors based on micro-beams or quartz scales.

Such sensors provide an analog electrical signal, which is then digitized to be locally processed by a computer for determining a model for controlling the lighting source.

"Operating cycle" means the time period during which the piece of equipment is active and provides a service by being mainly supplied by the storage element. The "operating cycle" takes place between two periods during which the piece of electrical equipment is generally (but not necessarily) inactive. The "operating cycle" generally (but not necessarily) does not include the periods during which the storage element is mainly recharged by the renewable energy source.

"Sensor" as used in this patent means a component directly measuring a local physical parameter, i.e. one in the immediate vicinity of the system, without resorting to the transmission of information from a remote source. In particular, a receiver receiving weather information, a wireless communication system or a processor associated with exchanging means of the TCP/IP, WiFi, WIMAX, Bluetooth or the Internet types are not to be considered as a sensor in the sense of the present patent.

According to a first alternative embodiment, the adjustment function takes into account the state of said energy storage element.

According to a second alternative embodiment, the adjustment function takes into account at least one factor related to the actual quantity of energy received by said renewable energy source.

The adjustment function preferably takes into account a parameter determined on the basis of the number of cycles of autonomy.

The invention also relates to an electrical system comprising an energy storage element and a renewable energy source as well as a circuit for managing the energy and controlling the power supply of a piece of electrical equipment, characterized in that said control circuit controls the supply power of said piece of equipment according to an adjustable reference time curve on the basis of at least one external factor and at least one internal factor, and the constraint that the integral over the operating cycle considered of said adjusted curve is lower than the quantity of energy which can be allocated from said energy storage element, during the considered operating cycle.

According to one embodiment, said piece of electrical equipment is a LED lighting power supply module, said energy storage element is a battery and said renewable energy source comprises photovoltaic cells.

According to a first alternative embodiment, the external factor is determined by an energy-managing electronic board comprising a temperature sensor of said battery and a power gauge.

According to a second alternative embodiment, the external factor is determined by the solar irradiance which depends on the geographical position of the location and operation place of said system.

According to a third alternative embodiment, the external factor is determined by the energy accumulated from the previous cycle.

The invention also provides an array of electrical systems complying with the above systems which comprise an array of energy storage sources and an array of renewable energy sources, a communication system as well as a circuit for managing energy and controlling the power supply of an array of electrical equipment.

Such control circuit controls the supply power of said piece of equipment according to an adjustable reference time curve on the basis of at least one external factor and at least one internal factor, and the constraint that the integral over the operating cycle considered of said adjusted curve is lower than the quantity of energy which can be allocated from said energy storage element, during the considered operating cycle.

According to an alternative embodiment, the communication system is defined by a radio-frequency link to exchange information on the local state of each system, to detect any possible defects in one or more lighting spots, and to synchronize the lighting program.

The invention also relates to a method for detecting one or more malfunction(s) on two scales:
an electrical system according to the invention
an array of electrical equipment according to the invention.

According to an alternative embodiment, the malfunctions are identified by one or more failure indicator(s) originating from the response to a series of questions corresponding to the analysis of the variations in the electrical, optical and/or thermal parameters estimated during the operation of said electrical system.

The failure indicators are preferably defined by a binary digital system (0: no or 1: yes).

According to another alternative embodiment, the method relates to a comparison of the state of the electrical equipment in the array of electrical systems on a time scale corresponding to the service life of each piece of electrical equipment.

According to an alternative embodiment, a major malfunction causing the stopping of said electrical system(s) is communicated by a frequency control (of the flash type) of said piece of electrical equipment prompting the local residents to inform the utilities concerned of such malfunction.

BRIEF DESCRIPTION OF THE DRAWINGS

The invention will be better understood upon reading the following description, relating to a non restrictive embodiment referring to the appended drawings wherein.

DETAILED DESCRIPTION

Figure 1:
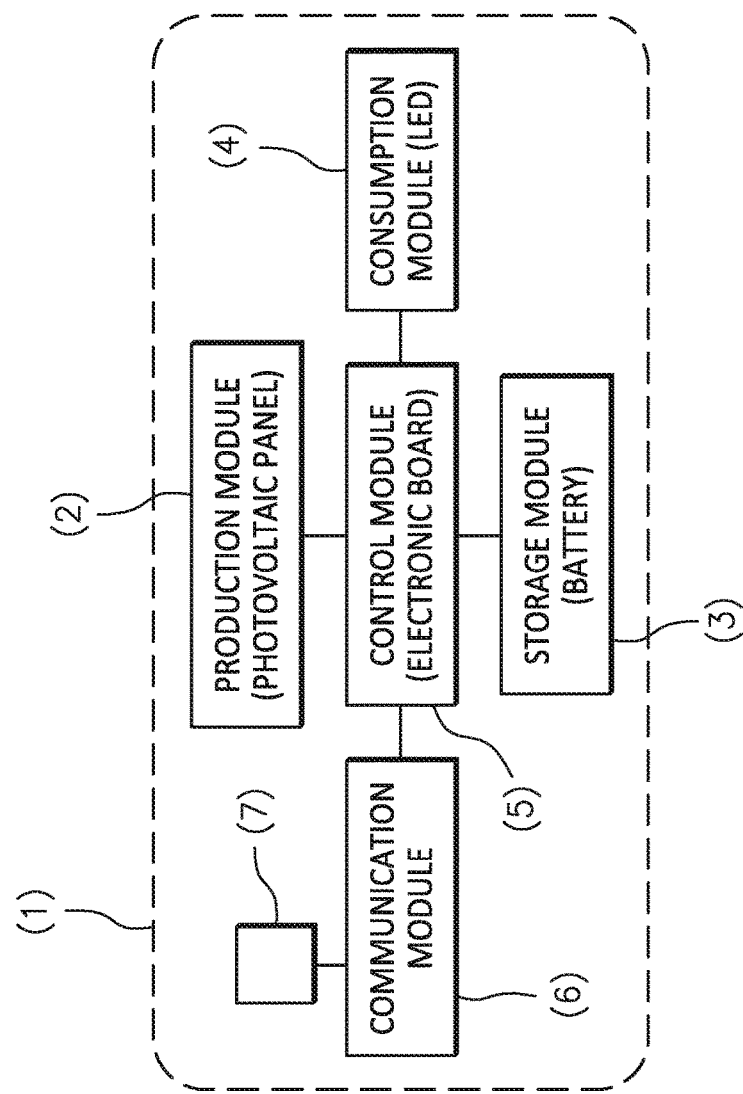
FIG. 1 shows the block diagram of an exemplary application to a self-sustained LED lighting system

FIG. 1 shows a block diagram of a lighting installation. It comprises a lamp 1 equipped with a photovoltaic panel 2 and an electrical battery 3 as well as a LED module 4.

All these components are controlled by a card managing the energy of the battery loader/unloader ("battery management system") type 5 controlling the power supply (driver) of the LED module 4.

Such card 5 contains a communication module 6 for receiving information relating to external factors and for transmitting system service and state information.

The card 5 receives information from sensors such as a temperature sensor, a power gauge and a presence sensor 7. The historical data provided by such sensors are periodically saved into one or more table(s) in order to enable the calculation of the power supply curves, and keep a history for an operation audit.

Such card controls the operation of the system to optimize the power supply curve. According to the object of the invention, such optimization aims at adapting the supply power applied to the LED module so as to enable an operation complying with the service expected throughout the operating cycle, whatever the battery charging conditions before the considered operating cycle.

The battery size is determined using the following methodology:

The rated capacity of the battery is determined on the basis of:
the longest duration of an operating cycle
the maximum energy (100%) consumed by the piece of equipment during the longest operating cycle
the battery output. Such output is about 0.7 for a lead battery, 0.8 for a NiMH battery, and 0.9 for a lithium battery.

the system output such reference value is then adjusted to take into account the expected autonomy. Such autonomy will be determined as the number of operating cycles during which the piece of equipment must operate autonomously.

A $C_{rated}$ rated capacity of the battery is thus determined, which would be sufficient to ensure a continuous operation at full power.

In the prior art, the persons skilled in the art would increase the actual capacity of the battery while taking into account a safety margin, to ensure operation even in the most unfavorable cases.

The invention consists in not doing so, and in selecting a battery, the capacity of which is sized for a favorable case, i.e. slightly less than the $C_{rated}$ rated capacity, and in modulating the power applied to the piece of electrical equipment according to a curve calculated as explained below.

The first step consists in determining a reference curve corresponding to the time evolution of the power applied to the piece of equipment during a reference cycle. Such curve takes into account the variations in the service requirements during the operating cycle.

Figure 2:
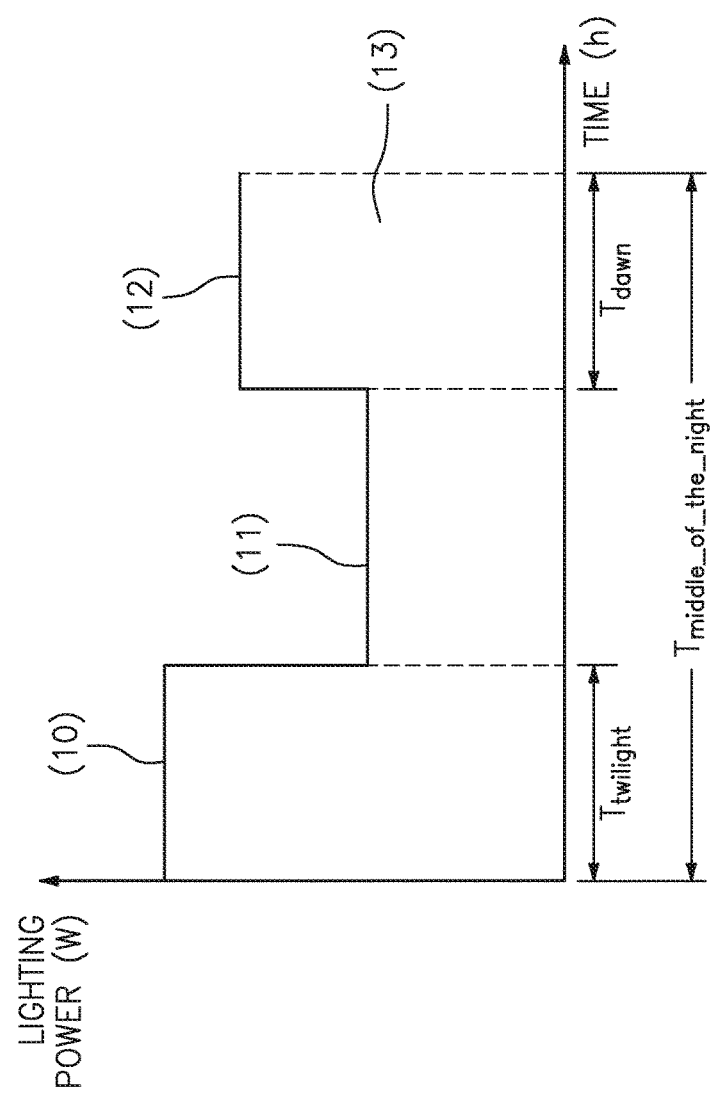
FIG. 2 shows the reference power supply curve

FIG. 2 shows an example of such a reference curve corresponding to the variation in the lighting power of a public lamp, according to an operating cycle corresponding to the night time.

During this cycle, the curve has a first power level $P_1$ 10 during a $T_{twilight}$ time interval corresponding to the periods when the potential traffic justifies a maximum lighting, adapted to the need for security of the application.

Then a second power level $P_2$ 11 during a $T_{middle\_of\_the\_night}$ time interval when the power can be reduced to produce a minimum standby lighting or even zero power.

Then, the power is again set to a power level $P_3$ 12 during a $T_{dawn}$ time interval corresponding to daybreak when the operation conditions (traffic, urban lighting, . . . ) justify a high lighting power.

Such curve is given as a simple example, it being understood that it can take different configurations, with continuous variations for instance.

The integral 13 corresponding to the surface delimited by the curve, in the time interval corresponding to the duration of the cycle, defines the $E_{rated}$ energy consumed by the piece of equipment, under the theoretical rated conditions. The capacity of the battery is so determined as to be slightly greater than such $E_{rated}$ energy without exceeding 150% of such $E_{rated}$ energy, and preferably without exceeding 110% of such $E_{rated}$ energy.

This curve is then adjusted by external factors. A first external factor is the schedule defining the duration of the cycle according to the varying light/dark cycle.

This factor may be derived from a clock integrated in the circuit 5, which adjusts the curve according to the schedule. It may also result from an incremental variation based on data acquired during one or more previous cycle(s), for example when the solar irradiance exceeds a threshold value, which can be viewed in one or more parameter(s) inside the renewable energy source.

Another external factor is the forecast irradiance, which may come from a remote source communicating with the system via the communication means 6. For this purpose, a weather server provides a forecast curve of solar irradiance before a new cycle.

Such external factor may also be calculated locally by a prediction means (trend analysis) which takes into account the information relating to the irradiance observed during one or more elapsed cycle(s), so as to determine a curve for the next cycle using a statistical processing.

Such factors are taken into account to reduce the maximum power forecast in the reference curve, when so imparted by the ambient conditions.

The internal factors are, for instance, a loss of performance of one of the components, more particularly the LED module or photovoltaic module outputs. Such factors are taken into account to adapt the lighting power forecast by the reference curve.

The modifications are constrained by the available energy. The application of the maximum power forecast by the reference curve will be conditioned by the effective capacity of the battery, and possibly the reference curve will be recalculated to take into account a capacity lower than the $E_{rated}$ energy and the configuration of the operator, which will be able to choose to set an absolute minimum value of the power applied to the LED module, or decide between the various configurations of the reference curve.

The recalculation of the curve, according to the actual capacity of the battery is performed by taking into account internal parameters, such as:
   the energy, state of charge and/or health of the battery at the beginning of the cycle, and possibly during the cycle
   the protection and failures management strategies during one or more cycle(s), leading to preserve a threshold storage capacity at the end of the cycle to avoid degrading the battery (too deep discharge)
   the ageing of the LED module and the photovoltaic cells and the electrical system output.

This recalculation consists in modifying the curve from the configuration determined during the previous step, so that the integral of the curve recalculated does not exceed the energy which can be actually allocated from the battery at the beginning of the cycle.

If this new calculation leads to no solution, the system will determine a minimum curve and will trigger an internal (warning light) or external (transmission of the alert to a monitoring server) alert and/or will report the situation of the lamp in question by means of the flashing of the LED module.

Trend Analysis

An alternative embodiment consists in improving the setting through a learning step.

For this purpose, the data acquired by one or more local sensor(s), during a period corresponding to one or more operating cycle(s), is saved to construct a local model of variation in the data concerned.

Such local model is used to adjust the reference curve from such predictive data.

A first exemplary model is constructed from a presence sensor, saved during an operating cycle, so as to determine the histogram of the passages. During the high traffic periods, the power level and/or the lighting time will be increased relative to the reference curve. On the contrary, during the periods of no passages or infrequent passages the power level and/or the lighting time relative to the nominal curve will be reduced, to increase the subsequently available energy reserve.

A second exemplary model takes into account the solar irradiance measured from the voltage produced by the photovoltaic cells, representing the solar periods corresponding to several days or even several weeks.

Such model will then be completed by the analysis of the current produced by the photovoltaic cells, representing the energy stored in the battery, so as to build a second predictive model for periods corresponding to several days or even several weeks.

The comparison of these two models will then be used to modulate the nominal reference curve of the lighting service.

Another predictive model corresponds to the ageing level of one system element, more particularly the battery. For this purpose, a charge-discharge cycle of the battery is periodically executed to save its response curve. This model is then corrected, as regards temperature and applied to the weighting of the nominal reference curve.

Other models may be developed, for example as a function of hygrometry, pollution, etc.

Optical Sensor LED

An alternative embodiment for the detection of the solar irradiance for adjusting the reference curve, or detecting the day/night cycle consists in using the LEDs in the optical sensor mode. For this purpose, an electronic circuit supplies the LED module with reverse voltage, using a pulsed method so as not to affect the lighting service. The measurement of the reverse voltage at the LED module terminals provides information on the level of solar irradiance which makes it possible to calibrate the variation model. A reference table saved in the electronic control circuit makes it possible to correct the reverse voltage measurements so as to compensate the errors due to temperature and to improve the accuracy of the estimation of the solar irradiance.

Such information may also be compared to the solar irradiance estimated by the photovoltaic module. The difference between the irradiance estimated from the photovoltaic module and the irradiance estimated from the LED module provides information on the ageing of the photovoltaic module. In particular, such difference is measured during a day of high irradiance (close to 1,000 watts per square meter), with the reference being provided by the LED module which is less subject to the operational environment and the limiting effects thereof (dust, sand accumulation, pollution, . . . ).

Such information will be used to weight the nominal reference curve so as to take into account the ageing of the photovoltaic module.

This measure is particularly relevant when the day of high irradiance follows a rainy day, as detected by a humidity sensor. Such situation makes it possible to take into account the cleaning of the photovoltaic module.

Energy Gauge

According to an alternative solution, the quantity of energy which can be allocated according to the nominal curve is periodically estimated, and where appropriate weighted by one or more local predictive model(s). When the quantity of energy which can be allocated is insufficient to provide a continuity of service during an operating cycle, the electronic circuit provides a preventive indicator, which makes it possible to warn an operator, and to switch the system to a restricted mode no longer performing the "no blackout" function. A portion of the energy which can be allocated is then dedicated to supplying an energy-saving warning signal.

Application to a Systems Array

The systems implementing the invention may be interconnected to define optimization strategies taking into account not only the local context of a system, but the overall context of a plurality of systems too.

Figure 3:
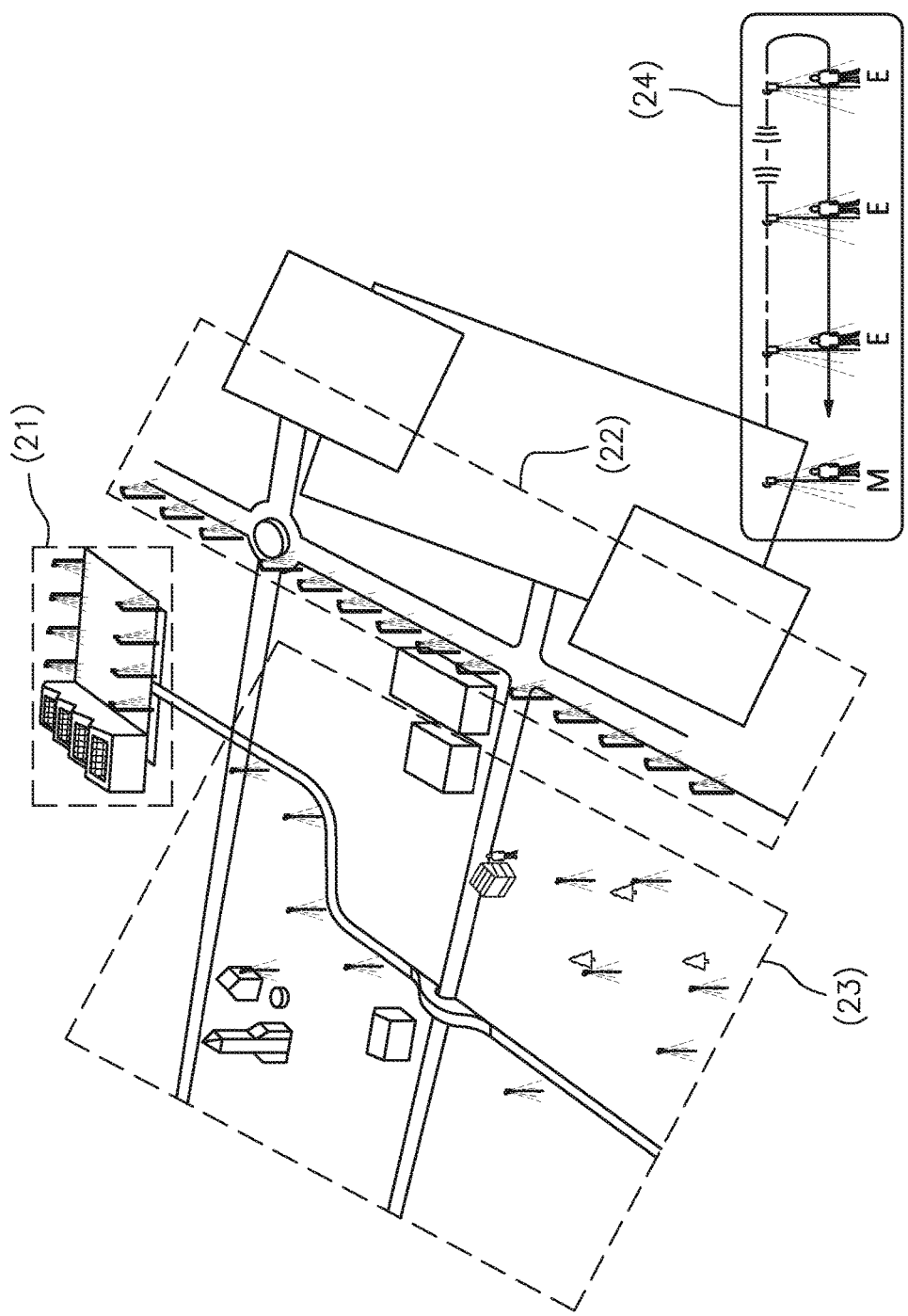
FIG. 3 shows a schematic view of an array of systems.

FIG. 3 shows an exemplary systems array according to the invention.

The site comprises one or more system(s) according to the invention 21, 22, 23 as well as a master-slave topology 24.

Such systems 21 to 24 communicate with each other through a radio-frequency link to exchange information on the local state of each system and to synchronize the lighting program.

The invention claimed is:

1. A method for dynamically controlling powering a piece of electrical equipment powered by a battery and a renewable energy source, with the power supply of said piece of equipment being temporally variable in an adjustable reference time curve, comprising the steps of:
   determining a rated capacity of the battery on the basis of:
   a longest duration of an operating cycle,
   a maximum energy consumed by the piece of electrical equipment during the longest operating cycle,
   a battery output efficiency,
   an expected autonomy;
   determining that the battery size is slightly less than the rated capacity of the battery; and
   adjustment according to at least one external factor and at least one internal factor, and the constraint that the integral over the considered operating cycle of said adjustable reference time curve is lower than a quantity of energy which can be allocated from said battery, during the operating cycle considered, with said external factors being physical parameters acquired by local sensors.

2. The method for dynamically controlling powering a piece of electrical equipment according to claim 1, wherein the adjustment function takes into account the state of said energy storage element.

3. The method for dynamically controlling powering a piece of electrical equipment according to claim 1, wherein the adjustment function takes into account at least one factor influenced by the efficiency of said renewable energy source.

4. The method for dynamically controlling powering a piece of electrical equipment according to claim 1, wherein the adjustment function takes into account a parameter determined on the basis of the number of cycles of autonomy.

5. The method for dynamically controlling powering a piece of electrical equipment according to claim 1, wherein the adjustment function takes into account at least one factor influenced by an efficiency of the piece of electrical equipment.

6. An electrical system comprising:
   a battery;
   a renewable energy source coupled to said battery;
   a controlling circuit for managing energy and controlling a power supply of a piece of electrical equipment associated with said battery and said renewable energy source, wherein said controlling circuit is configured to control the power supply of said piece of electrical equipment according to an adjustable reference time curve on the basis of at least one external factor and at least one internal factor, and a constraint that an integral over an operating cycle considered for said adjustable reference time curve is lower than a quantity of energy which can be allocated from said battery, during the operating cycle considered; and wherein said controlling circuit is configured to control the power supply of said piece of electrical equipment according to a rated capacity of the battery on the basis of at least one of a longest duration of an operating cycle, a maximum energy consumed by the piece of electrical equipment during the longest operating cycle, a battery output efficiency, an expected autonomy, and determining that the battery size is slightly less than the rated capacity of the battery.

7. The electrical system according to claim 6, wherein said piece of electrical equipment is a LED lighting module, said battery is an energy storage element and said renewable energy source is composed of photovoltaic cells.

8. The electrical system according to claim 7, wherein the internal factor is determined by an electronic card for managing energy and controlling the power supply of said piece of electrical equipment having a temperature sensor of said battery, and a power gauge.

9. The electrical system according to claim 7, wherein the external factor is determined by a geographical position of a location and operation place of said electrical system.

10. The electrical system according to claim 7, wherein the external factor is determined by a quantity of energy stored from at least one previous cycle.

11. An array of electrical systems according to claim 6, comprising an array of batteries and an array of renewable energy sources, a communication system as well as a circuit for managing energy and controlling the power supply of an array of electrical equipment, wherein said control circuit controls the supply power of said piece of equipment according to an adjustable reference time curve on the basis of at least one external factor and at least one internal factor, and a constraint that an integral over a considered operating cycle of said adjustable reference time curve is lower than a quantity of energy which can be allocated from said battery energy, during the operating cycle considered.

12. The array of electrical systems according to claim 1, wherein the communication system is defined by a radio-frequency link to exchange information on a local state of each system, detect possible malfunctions in one or more lighting spots, and to synchronize a lighting program.

13. A method for detecting at least one malfunction on two scales, said two scales comprising an electrical system according to claim 7, and an array of electrical equipment according to claim 11, wherein the malfunctions are identified by at least one failure indicator originating from a response to a series of questions corresponding to an analysis of variations in the electrical, optical and/or thermal parameters estimated during operation of said electrical system.

14. The method for detecting at least one malfunction according to claim 13, wherein the failure indicators are defined by a binary digital system (0: no or 1: yes).

15. The method for detecting at least one malfunction according to claim 13, wherein said method relates to a comparison of a state of the electrical equipment of the array of the electrical systems on a time scale corresponding to a service life of each piece of electrical equipment.

16. The method for detecting at least one malfunction according to claim 13, wherein a major malfunction causing said system(s) to stop is communicated by a flash type frequency control of said piece of electrical equipment prompting local residents to inform utilities concerned of such malfunction.

* * * * *